United States Patent [19]
Chaya et al.

[11] Patent Number: 5,361,242
[45] Date of Patent: Nov. 1, 1994

[54] EXTERNAL MAGNETIC FIELD APPLICATION DEVICE INCLUDING A HEAT DISSIPATION MEMBER AND A METAL PLATE FOR DISSIPATING HEAT

[75] Inventors: Masahiko Chaya, Yokohama; Toru Takahashi, Kawasaki, both of Japan

[73] Assignee: Canon Kabushiki Kaisha, Tokyo, Japan

[21] Appl. No.: 59,729

[22] Filed: May 11, 1993

Related U.S. Application Data

[63] Continuation of Ser. No. 651,421, Feb. 6, 1991, abandoned.

[30] Foreign Application Priority Data

| Feb. 7, 1990 [JP] | Japan | 2-029301 |
| Jun. 4, 1990 [JP] | Japan | 2-144530 |
| Jun. 4, 1990 [JP] | Japan | 2-144531 |
| Feb. 4, 1991 [JP] | Japan | 3-013394 |

[51] Int. Cl.$^5$ ............................. G11B 13/04
[52] U.S. Cl. .................... 369/13; 360/114; 360/66
[58] Field of Search ............ 369/13; 360/114, 59, 360/66; 365/122

[56] References Cited

U.S. PATENT DOCUMENTS 4,796,241  1/1989  Hayakawa et al. ............ 369/13

FOREIGN PATENT DOCUMENTS

| 60-240464 | 11/1985 | Japan. | |
| 62-046450 | 2/1987 | Japan | 360/114 |
| 63-55704 | 3/1988 | Japan | 360/114 |

*Primary Examiner*—Hoa T. Nguyen
*Attorney, Agent, or Firm*—Fitzpatrick, Cella, Harper & Scinto

[57] ABSTRACT

Disclosed is an external magnetic field application device for use in an optical information recording and reproducing apparatus. The device has a winding wound on an outer periphery of a magnetic pole piece and a magnetic plate attached to the magnetic pole piece to form a magnetic circuit. The device includes a heat dissipation member arranged to contact an outer periphery of the winding for conducting heat generated in the winding, when the winding is energized, to the magnetic plate, and a metal plate arranged on top of the heat dissipation member for dissipating heat of the heat dissipation member.

18 Claims, 7 Drawing Sheets

EXTERNAL MAGNETIC FIELD APPLICATION DEVICE INCLUDING A HEAT DISSIPATION MEMBER AND A METAL PLATE FOR DISSIPATING HEAT

This application is a continuation of prior application Ser. No. 07/651,421 filed Feb. 6, 1991, now abandoned.

BACKGROUND OF THE INVENTION

1. Field of the Invention

The present invention relates to an external magnetic field application device which is primarily used for a magneto-optical disk apparatus.

2. Related Background Art

In a prior art magneto-optical recording system which is a kind of erasable optical disk apparatus, information is recorded and erased by using a principle that a magnetic film is heated by a laser spot and a magnetic field of several hundreds of oersteads is applied, and then the heat is removed so that the magnetic film is magnetized in the direction of the external magnetic field. When a predetermined direction of magnetization is defined as recording, the opposite direction is defined as erasure.

Figure 1:
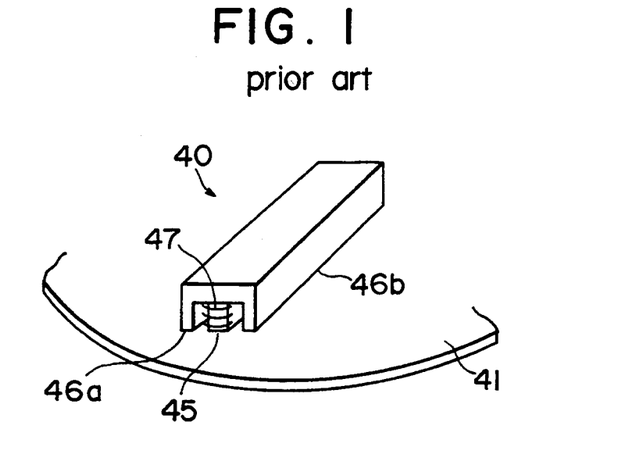
FIG. 1 shows a prior art external magnetic field application device.

FIG. 1 shows a structure of a prior art external magnetic field generator. As shown, the external magnetic field generator 40 primarily comprises a magnetic pole piece 45 and magnetic plates 46a and 46b. The magnetic pole piece 45 and the magnetic plates 46a and 46b are linked by a magnetic material at their one ends. The magnetic pole piece 45 and the magnetic plates 46a and 46b are of elongated shape and are arranged radially with respect to a recording magneto-optical disk 41. A winding coil 47 is wound around the magnetic pole piece 45 and a magnetic field is generated by supplying a current to the winding 47. The generated magnetic field goes into the opposite magnetic plates 46a and 46b from the end of the magnetic pole piece 45, and a component of the magnetic field which is perpendicular to the disk 41 serves as the external magnetic field to record or erase the information to and from the magnetic film. In this arrangement, since the reversal of the magnetic field is done by reversing the direction of the current, a speed of reversal of the magnetic field is high.

Figure 2:
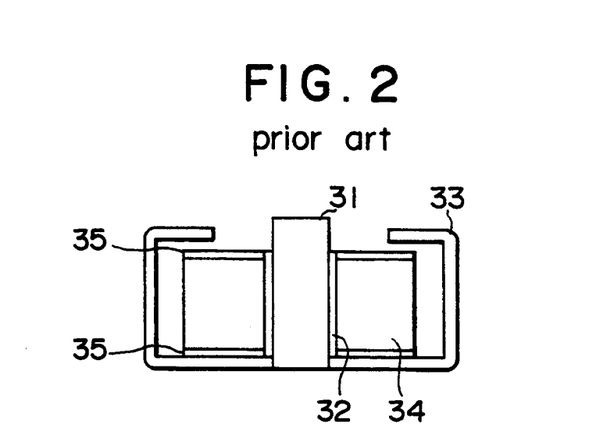
FIG. 2 shows a detailed sectional view of the external magnetic field application device shown in FIG. 1.

FIG. 2 shows a detailed sectional view of the external magnetic field application device shown in FIG. 1. In this type of external magnetic field application device, electrically insulated molded members or insulative tapes 32 and 35 are arranged between the winding 34 and the magnetic pole piece 31 or the magnetic plate 33 to prevent the electrical short-circuit of the winding.

However, in this arrangement, when a current is supplied to the winding for a long period, the temperature of the winding rises due to Joule heat generated in the winding, because the materials surrounding the winding prevent the heat dissipation.

Such heat generation by the external magnetic field application device raises the temperature of the apparatus and adversely affects the characteristics of other electrical components, and also heats the recording medium to adversely affect the stability of the recorded information.

SUMMARY OF THE INVENTION

In light of the above, it is an object of the present invention to provide an external magnetic field application device which uses an insulative material having a good heat dissipation property so that Joule heat generated in a winding is efficiently conducted to a magnetic pole piece and/or to magnetic plates.

The above object of the present invention is achieved by an external magnetic field application device in which a coil is wound around the magnetic pole piece and the magnetic plates are linked to the magnetic piece to form a magnetic circuit, and which has a heat dissipation member for dissipating the heat generated when the winding is energized.

Details will be described in connection with embodiments of the present invention.

DETAILED DESCRIPTION OF THE PREFERRED EMBODIMENTS

Figure 3:
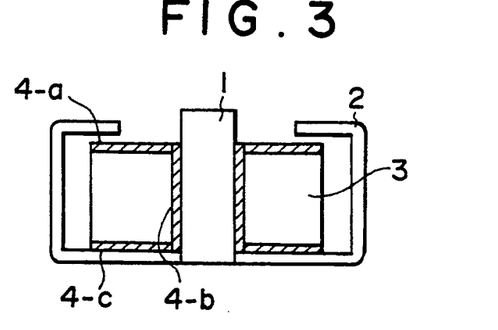
FIG. 3 shows a first embodiment of an external magnetic field application device of the present invention.
Figure 4:
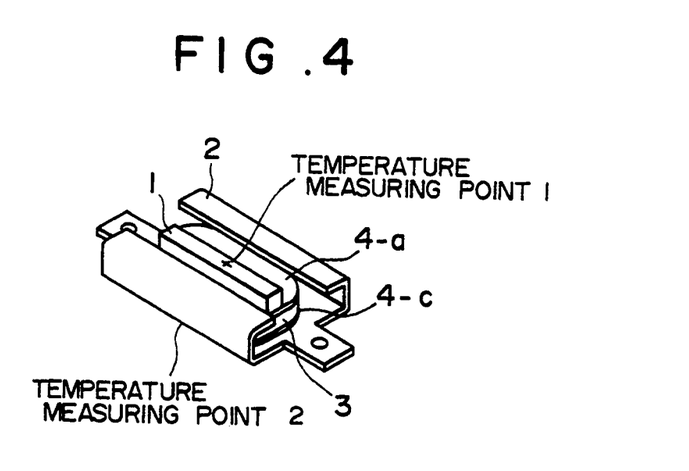
FIG. 4 shows measuring points selected to observe a heat generation prevention effect of the external magnetic field application device shown in FIG. 3.

In FIGS. 3 and 4, numeral 1 denotes a pole-shaped magnetic pole piece around which a winding 3 is arranged. A channel-shaped magnetic plate 2 is attached to one end of the magnetic pole piece and the magnetic pole piece 1 and the winding 3 are covered by the magnetic plate 2. In the present embodiment, the winding 3 has electrically insulative heat dissipation members 4a, 4b and 4c on an inner periphery and upper and lower end planes thereof and the heat dissipation member 4b on the inner periphery contacts the magnetic pole piece. The term electrically insulative herein used means that it prevents electrical short-circuit between the magnetic plate and the winding. The magnetic pole piece 1 may be covered by a tubular heat dissipation member 4b and the winding 3 may be fit to the member 4b. After the winding has been loaded, the magnetic plate is caulked to hold the winding.

The material of the heat dissipation member is preferably highly elastic, of little change by aging, highly electrically insulative and highly heat dissipative.

For example, a preferable material may be silicon having ceramics (fine ceramics or boron nitride) added to disperse in granular fashion. In terms of physical properties, thermal conductivity is no smaller than $15 \times 10^{-4}$ cal/cm$^2$·sec·°C., more preferably no smaller than $25 \times 10^{-4}$ cal/cm$^2$·sec·°C. (conventional silicone rubber has a thermal conductivity of $3.7$–$5.4 \times 10^{-4}$ cal/cm$^2$·sec·°C., and polyester has $3.4 \times 10^{-4}$ cal/cm$^2$·sec·°C.), thermal resistance is no larger than 2° C./W at 0.2 mm thickness, and breakdown voltage is no smaller than 1.5 kV.

The heat dissipation material is preferably of highly elastic material because contact with the winding which has an uneven surface is enhanced so that the thermal conduction effect is enhanced.

In the magnetic circuit formed by the winding 3, the magnetic pole 1 and the magnetic plate 2, current is supplied to the winding to create an electro-magnetic force. Joule heat is generated in the winding and the temperature thereof rises. However, since the heat in the winding is readily conducted to the magnetic pole piece and the magnetic plate through the heat dissipation member, the temperature rise may be suppressed within an allowable limit.

The measurement of the temperature rise of the external magnetic field application device at measuring points shown in FIG. 4 is now described. A temperature measuring point 1 is defined at a center of the magnetic pole piece 1, and a temperature measuring point 2 is defined at a point on a back side (bottom side) of the magnetic field 2 facing the temperature measuring point 1. An atmosphere temperature measuring point (not shown) is separately arranged. A thermocouple is fixed by an adhesive tape to each of the measuring points. A current of a predetermined magnitude was applied to the winding, and the temperature thereof raised to 20°-24° C. in a certain time period. The measurement was terminated when the temperature was stabilized.

For comparison purposes, a polyimide tape was attached to the winding instead of the heat dissipation member and the temperature was measured. The temperature rose to 27°-31° C. under the same condition.

It is thus seen that the temperature may be lowered by 2°-9° C. by the present invention.

Figure 5:
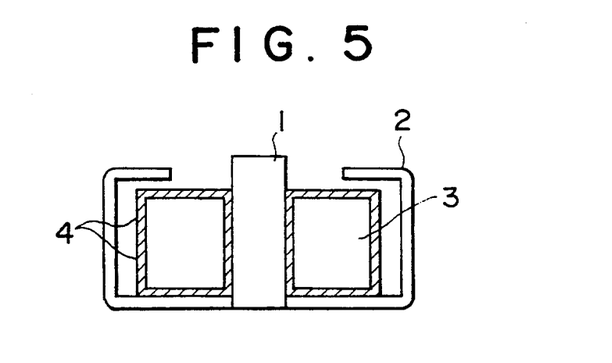
FIG. 5 shows a second embodiment of the external magnetic field application device of the present invention.

FIG. 5 shows a second embodiment. In the present embodiment, the winding 3 is provided with an electrically insulative heat dissipation member on an outer periphery as well. In the present embodiment, an annular cap-shaped heat dissipation member 4 is used in combination. It may be manufactured by molding.

Figure 6:
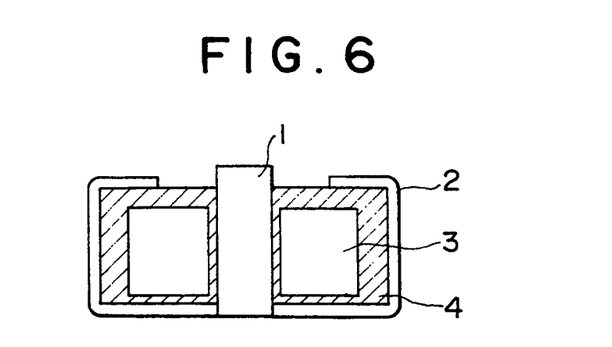
FIG. 6 shows a third embodiment of the external magnetic field application device of the present invention.

FIG. 6 shows a third embodiment. In the present embodiment, an electrically insulative heat dissipation material 4 is filled in spaces between the winding 3, and the magnetic pole piece 1 and the magnetic plate 2.

Figure 7:
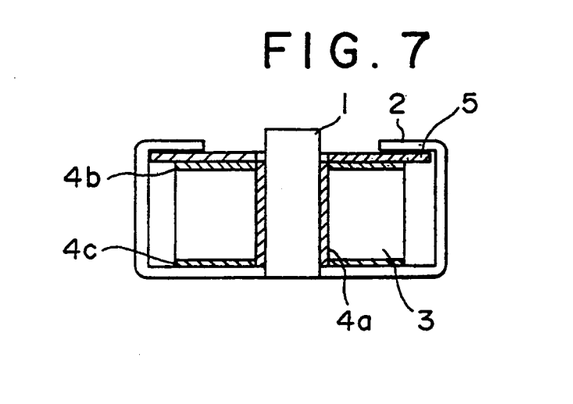
FIGS. 7, 8 and 9 show a fourth embodiment of the external magnetic field application device of the present invention.
Figure 8:
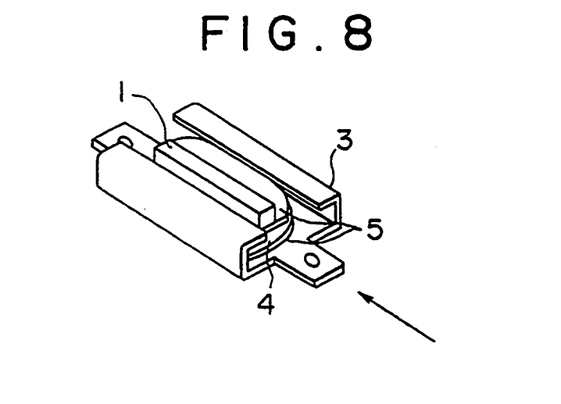
Figure 9:
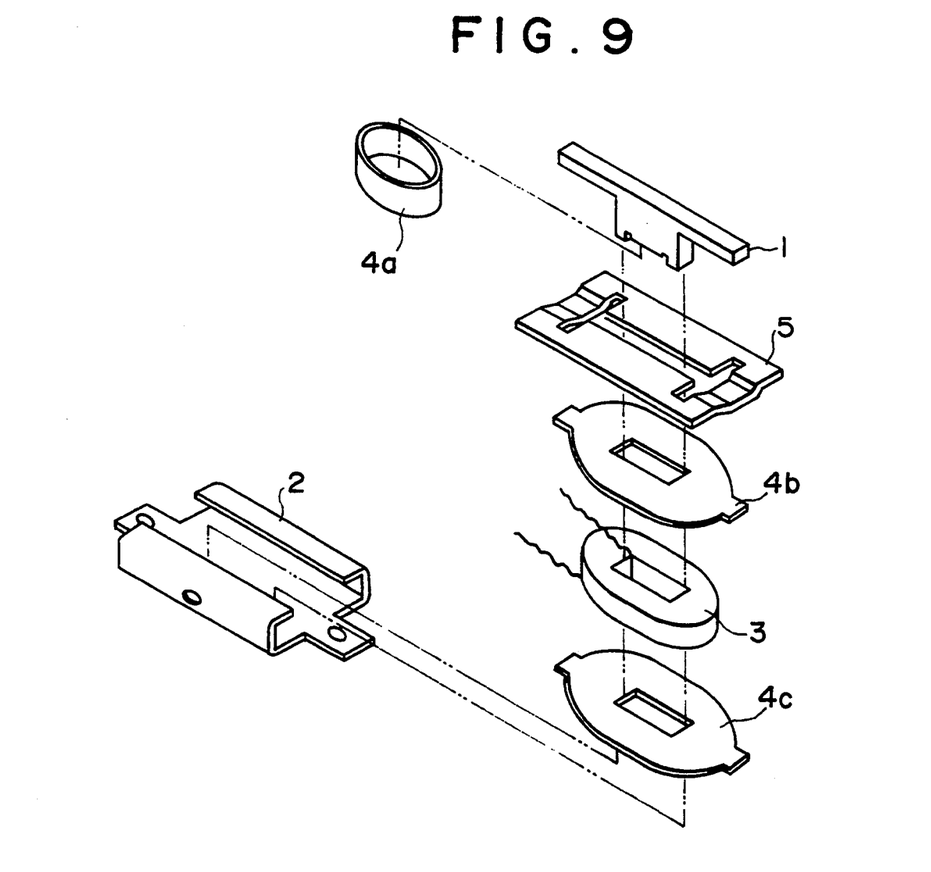

FIGS. 7, 8 and 9 show a fourth embodiment. In the present embodiment, upper and lower heat dissipation members 4b and 4c with adhesive materials are stacked on the upper and lower ends of the winding 3, and it is assembled into the magnetic pole piece having the heat dissipation member fitted thereto. A thermal conduction member 5 is arranged between the heat dissipation member 4b and the upper edge of the magnetic plate. The thermal conduction member 5 thermally couples the heat dissipation member 4b and the magnetic plate. Thus, the heat in the heat dissipation member 4b is conducted to the magnetic plate through the heat dissipation member 5 so that the heat is dissipated by the magnetic plate. The material of the thermal conduction member 5 preferably has a high thermal conductivity, and it has preferably an aluminum alloy or a material having a higher thermal conductivity. It has a thermal conductivity which is approximately five times as high as that of conventional silicone rubber, approximately two times as high as that of mica and approximately seven times as high as that of polyester.

The material of the heat dissipation member is preferably highly elastic, of little change by aging, highly electrically insulative and highly heat dissipative.

For example, a preferable material may be silicon having ceramics (fine ceramics or boron nitride) added to disperse in granular fashion. In terms of physical properties, thermal conductivity is no smaller than $15 \times 10^{-4}$ cal/cm$^2$·sec·°C., more preferably no smaller than $25 \times 10^{-4}$ cal/cm$^2$·sec·°C. (conventional silicone rubber has a thermal conductivity of $3.7-5.4 \times 10^{-4}$ cal/cm$^2$·sec·°C., and polyester has $3.4 \times 10^{-4}$ cal/cm$^2$·sec·°C.), thermal resistance is no larger than 2° C./W at 0.2 mm thickness, and breakdown voltage is no smaller than 1.5 kV.

In the magnetic circuit formed by the winding 3, the magnetic pole 1 and the magnetic plate 2, current is supplied to the winding to create an electro-magnetic force. Joule heat is generated in the winding and the temperature thereof rises. However, since the heat in the winding is readily conducted to the magnetic pole piece and the magnetic plate through the heat dissipation member, the temperature rise may be suppressed within an allowable limit.

The measurement of the temperature rise of the external magnetic field application device at the following measuring points is now described. A temperature measuring point 1 is defined at a center of the magnetic pole piece 1, and a temperature measuring point 2 is defined at a point on a back side (bottom side) of the magnetic field 2 facing the temperature measuring-point 1. An atmosphere temperature measuring point (not shown) is separately arranged. A thermocouple is fixed by an adhesive tape to each of the measuring points. A current of a predetermined magnitude (0.12 A) was applied to the winding, and the temperature thereof raised to 9°-12° C. in a certain time period (3 minutes). The measurement was terminated when the temperature was stabilized.

For comparison purposes, a polyimide tape was attached to the winding instead of the heat dissipation member and the temperature was measured. The temperature rose to 22°-24° C. under the same condition.

The temperature of the winding per se as calculated by the conversion from an electrical resistance is 12°-15° C. in the present invention. (The temperature by a prior art electrical insulative material is 22°-24° C.)

It is thus seen that the temperature is substantially (5°-7° C.) lowered by the present invention.

When the thermal conduction member was removed as shown in FIG. 2, no heat dissipation effect on the upper side was observed.

In the present embodiment, the thermal conduction member is arranged between the upper heat dissipation plate and the magnetic plate although it may be arranged between the heat dissipation plate and the magnetic pole piece.

In the present invention, the electrically insulative member having the high heat dissipation property is attached to the outer surface of the winding of the external magnetic field application device to suppress the heat generation of the external magnetic field application device. Consequently, the affect on the components of the external magnetic field application device and the recording medium by the heat generation in the device is prevented. Cooling of the external magnetic field application device is therefore not necessary and a dust proof structure in the device may be readily arranged.

Further detail of the external magnetic field application device of the present invention are explained with reference to FIGS. 10 and 11.

Figure 10:
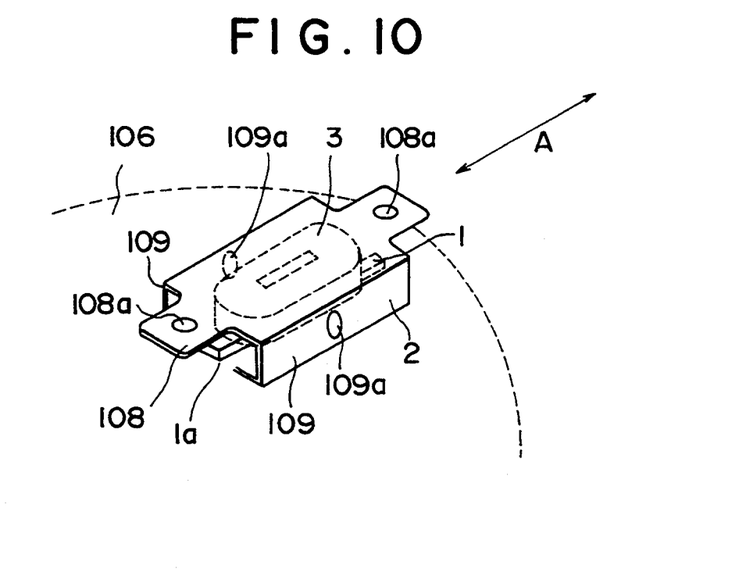
FIG. 10 shows a detail of the external magnetic field application device of the present invention.

FIG. 10 shows a perspective view of a yoke of the external magnetic field application device of the present invention. Numeral 1 denotes a magnetic core which functions as a magnetic pole, on which a flat-shaped winding 2 is wound. Numeral 3 denotes a magnetic plate made of a ferromagnetic material, which is shaped to cover the magnetic core and the winding. A portion of the magnetic core 1 which faces a recording area of the recording medium serves as a magnetic field radiation surface 1a for applying a magnetic field. The magnetic field radiation surface 1a extends in the direction of a recording area of an optical disk 106 which is the recording media (namely, radially of the disk and widthwise of the recording area, the direction A in FIG. 10), and radiates the magnetic field to the recording media surface. The yoke formed by the magnetic plate is magnetically coupled to the magnetic field radiation surface.

The yoke 3 formed by the magnetic plate is a lamination of thin ferromagnetic plates, and it is parallel to the magnetic field radiation surface 1a and extends in the direction A. One or more holes are formed at a portion 108 and a bolt head which serves to adjust a gap between the magnetic field radiation surface 1a and the recording medium surface and as an engaging member to position the magnetic field radiation surface 1a is engaged with the hole 108a. The engaging member is not limited to the bolt but it may be a pin having a ball end. A hole 109a or shaft (dowel) for supporting the yoke 3 may be formed on a plane 109 of the yoke 3 which is perpendicular to the magnetic field radiation surface 1a to support the external magnetic field application device including the magnetic core 1, the winding 2 and the yoke 3 and adjust the inclination.

Figure 11:
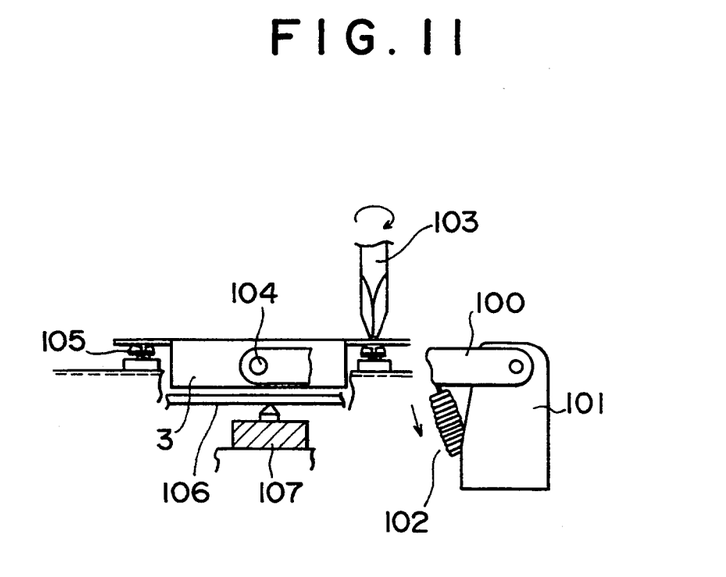
FIG. 11 shows the external magnetic field application device of FIG. 10 attached to an optical disk apparatus.

FIG. 11 shows a partial structure of an optical disk apparatus which uses the yoke-shaped external magnetic field application device shown in FIG. 10.

A support shaft 104 formed in a support arm 100 is fitted to the hole 109a and the entire external magnetic field application device is biased downward toward the optical disk 106 by a compression spring 102. Numeral 101 denotes a support which supports the support arm 100. In this manner, the adjusting engaging hole 108a engages with the height and tilt adjusting screw 105 and a height adjusting driver 103 may be inserted from the top.

In this manner, the gap between the external magnetic field application device and the optical recording medium can be adjusted without increasing the whole thickness of the external magnetic field application device and the positioning and the retraction of the external magnetic field application device when a cartridge containing an optical disk is inserted into the optical disk apparatus are also attained. Numeral 107 denotes an optical head which irradiates a light beam to the optical disk 106. The adjusting engaging holes 108a are formed parallel to the direction A on the opposite sides of the winding 2. The supporting holes 109a are formed parallel to the direction perpendicular to the direction A on the opposite sides of the winding 2.

The yoke has the engagement for the adjusting member for adjusting the gap between the magnetic field radiation surface and the recording medium surface, on the surface which is substantially parallel to the magnetic field radiation surface, and the portion to support and hold the yoke for adjusting the gap between the magnetic field radiation surface and the recording media surface, on the surface which is substantially perpendicular to the magnetic field radiation surface.

The height and tilt adjusting screw 105 may be attached to any member other than the yoke. Thus, it may be attached to the cartridge holder or the optical disk apparatus. When it is attached to the cartridge holder, the apparatus may be compact and thin.

In the above embodiments, the two adjusting holes 108a are circular, although one of them may be a slot. The adjusting holes 108a may be of any shape and the supporting holes 109a or the supporting shaft 104 may be at any points between the two adjusting holes.

We claim:

1. An external magnetic field application device for applying a bias magnetic field to a recording medium, said device comprising:
    a magnetic pole piece;
    a magnetic plate coupled to an edge portion of said magnetic pole piece and being substantially open channel-shaped to surround both sides of the magnetic pole piece, wherein both edge portions of said magnetic plate are each bent in a direction towards said magnetic pole piece;
    a winding wound on said magnetic pole piece;
    a first heat dissipation member, provided between said winding and said magnetic pole piece, a second heat dissipation member provided between said winding and the bottom of said magnetic plate and a third heat dissipation member provided between said winding and the bent edge portions of said magnetic plate, for conducting heat generated in said winding, when said winding is energized, to said magnetic plate; and
    a metal plate, positioned near an edge portion of the magnetic pole piece opposite to the edge portion to which the magnetic plate is coupled and in a gap formed between said third heat dissipation member and the bent edge portions of said magnetic plate, for covering said winding and said heat dissipation members and for thermally coupling said third heat dissipation member to the bent edge portions of said magnetic plate, said metal plate having a higher thermal conductivity than that of said magnetic plate.

2. An external magnetic field application device according to claim 1, wherein said heat dissipation member comprises an elastic member.

3. An external magnetic field application device according to claim 2, wherein said heat dissipation member is electrically insulative.

4. An external magnetic field application device according to claim 2, wherein a portion of said heat dissipation member contacts said magnetic plate.

5. An external magnetic field application device according to claim 1, wherein said heat dissipation member is arranged to fill in a gap between the magnetic plate and the winding.

6. An external magnetic field application device according to claim 1, wherein said heat dissipation member is primarily made of silicone rubber.

7. An external magnetic field application device according to claim 1, wherein said heat dissipation member has a thermal conductivity of at least $15 \times 10^{-4}$ cal/cm$^2$·sec·°C.

8. An external magnetic field application device according to claim 1, wherein said heat dissipation member has a thermal resistance of at most 2° C./W at 0.2 mm thickness.

9. An external magnetic field application device according to claim 1, wherein said metal plate is made of an aluminum alloy.

10. An optical information recording and reproducing apparatus for effecting at least one of recording of information on and reproducing of information from a recording medium by irradiating a light beam on the recording medium while applying a magnetic field in a predetermined direction, said apparatus comprising:

recording and reproducing means for effecting recording and reproducing of information by irradiating the recording medium with the light beam; and external magnetic field application means for generating the magnetic field, said external magnetic field application means comprising:

a magnetic pole piece, a magnetic plate coupled to an edge portion of said magnetic pole piece and being substantially open channel-shaped to surround both sides of said magnetic pole piece, wherein both edge portions of said magnetic plate are each bent in a direction towards said magnetic pole piece, a winding wound on said magnetic pole piece, a first heat dissipation member, provided between said winding and said magnetic pole piece, a second heat dissipation member provided between said winding and the bottom of said magnetic plate and a third heat dissipation member provided between said winding and the bent edge portions of said magnetic plate, for conducting heat generated in the winding, when the winding is energized, to said magnetic plate, and a metal plate positioned near an edge portion of said magnetic pole piece opposite to the edge portion to which said magnetic plate is coupled and in a gap formed between said third heat dissipation member and the bent edge portions of said magnetic plate, for covering said winding and said heat dissipation members and for thermally coupling said third heat dissipation member to the bent edge portions of said magnetic plate, said metal plate having a higher thermal conductivity than that of said magnetic plate.

11. An optical information recording and reproducing apparatus according to claim 10, wherein said heat dissipation member comprises an elastic member.

12. An optical information recording and reproducing apparatus according to claim 11, wherein said heat dissipation member is electrically insulative.

13. An optical information recording and reproducing apparatus according to claim 11, wherein a portion of said heat dissipation member contacts said magnetic plate.

14. An optical information recording and reproducing apparatus according to claim 10, wherein said heat dissipation member is arranged to fill in a gap between the magnetic plate and the winding.

15. An optical information recording and reproducing apparatus according to claim 10, wherein said heat dissipation member is primarily made of silicone rubber.

16. An optical information recording and reproducing apparatus according to claim 10, wherein said heat dissipation member has a thermal conductivity of at least $15 \times 10^{-4}$ cal/cm$^2$·sec·°C.

17. An optical information recording and reproducing apparatus according to claim 10, wherein said heat dissipation member has a thermal thickness of at most 2° C./W at 0.2 mm thickness.

18. An optical information recording and reproducing apparatus according to claim 10, wherein said metal plate is made of an aluminum alloy.

* * * * *

UNITED STATES PATENT AND TRADEMARK OFFICE
CERTIFICATE OF CORRECTION

PATENT NO. : 5,361,242
DATED : November 1, 1994
INVENTOR(S) : Masahiko CHAYA, et al.

It is certified that error appears in the above-indentified patent and that said Letters Patent is hereby corrected as shown below:

COLUMN 1:

Line 20, "oersteads" should read --oersteds--.

COLUMN 4:

Line 62, "affect" should read --effect--; and
Line 67, "dust proof" should read --dust-proof--.

COLUMN 5:

Line 16, "media" should read --medium--;
Line 19, "media" should read --medium--;
Line 37, "adjust" should read --to adjust--; and
Line 54, "vice" should read --vice,--.

COLUMN 6:

Line 3, "media" should read --medium--.

Signed and Sealed this

Second Day of January, 1996

Attest:

BRUCE LEHMAN

Attesting Officer        Commissioner of Patents and Trademarks